Figure 1:
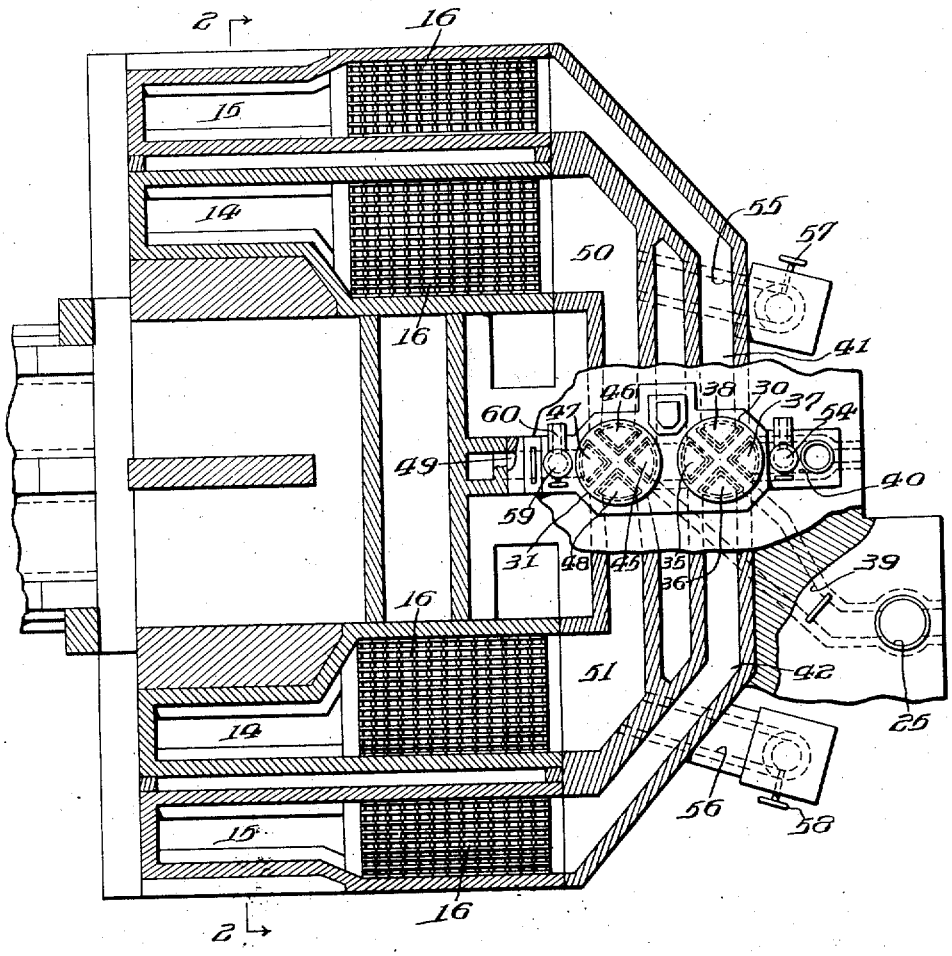

N. E. MACCALLUM.

PROCESS AND APPARATUS FOR THE MANUFACTURE OF STEEL.

APPLICATION FILED MAY 26, 1914.

Reissued July 28, 1914.

13,782.

2 SHEETS—SHEET 1.

INVENTOR

Norman E. Maccallum.

WITNESSES

H. J. Hartman.

A. J. Gardner

BY

ATTORNEY

N. E. MACCALLUM.

PROCESS AND APPARATUS FOR THE MANUFACTURE OF STEEL.

APPLICATION FILED MAY 26, 1914.

Reissued July 28, 1914.

13,782.

2 SHEETS—SHEET 2.

INVENTOR

Norman E. Maccallum

WITNESSES

F. J. Hartman.

A. D. Gardner

BY

ATTORNEY

UNITED STATES PATENT OFFICE.

NORMAN E. MACCALLUM, OF PHOENIXVILLE, PENNSYLVANIA, ASSIGNOR OF ONE-FOURTH TO FRANK P. NORRIS, OF PHOENIXVILLE, PENNSYLVANIA, AND ONE-FOURTH TO THE PHOENIX IRON COMPANY, OF PHILADELPHIA, PENNSYLVANIA, A CORPORATION OF PENNSYLVANIA.

PROCESS AND APPARATUS FOR THE MANUFACTURE OF STEEL.

13,782. Specification of Reissued Letters Patent. Reissued July 28, 1914.

Original No. 1,057,564, dated April 1, 1913, Serial No. 671,480. Application for reissue filed May 26, 1914. Serial No. 841,167.

*To all whom it may concern:*

Be it known that I, NORMAN E. MACCALLUM, a citizen of the United States, and a resident of Phoenixville, county of Chester, and State of Pennsylvania, have invented a certain new and useful Process and Apparatus for the Manufacture of Steel, of which the following is a specification.

Heretofore it has been customary, in the manufacture of open hearth steel, to utilize a furnace comprising an oblong hearth arched over by a roof; two pairs or sets of checker chambers or regenerators, one pair being arranged adjacent each end of the hearth; means for supplying gaseous fuel and air to the hearth alternately through the two sets of regenerators; and a stack suitably connected to be placed in communication with the hearth alternately through the two sets of regenerators, to receive the gaseous products of combustion or exhaust or waste gases from the hearth. In the operation of this furnace as heretofore constructed, it is customary to first heat the furnace by means of a wood fire until the regenerators, or one set of the regenerators, have attained a dull red heat. The gaseous fuel is then passed inwardly through one, and air is passed inwardly through the other of one set of the regenerators, that have been thus heated, the gaseous fuel and the air being preheated by these hot regenerators and passing from this set of regenerators through corresponding ports provided therefor in the furnace. The gaseous fuel and air then unite in combustion over the hearth and the gaseous products of combustion or exhaust gases are then led out through a second pair of ports provided therefor opposite the first mentioned pair of ports, and then through the other pair of regenerators, the waste gases reheating the checkers in the latter regenerators and finally passing out through the stack.

At frequent intervals, the currents of gaseous fuel and air are reversed and caused to flow inwardly through the pair of regenerators which had been reheated during the preceding period by the exhaust gases, and the exhaust gases are discharged through the other pair of regenerators that have been serving during the preheating period, as inlets for the air and gaseous fuel. These reversals are maintained regularly until the furnace has been brought to a full melting heat and has been charged, and until the charge is ready to tap, the gaseous fuel being conducted into the furnace alternately through the same two regenerators, one of each pair, which are known as the gas regenerators, and the air being always conducted into the furnace alternately through the other two regenerators, one of each pair, which are known as the air regenerators.

One objection that has been found to exist, and which has not heretofore been overcome, in the ordinary apparatus and process just described, is, that the efficiency of the regenerators is steadily and rapidly decreased during the operation of the furnace, by deposits, of flue dust, comprising probably iron oxid, slag, etc., which settle upon and adhere to the checkers in the two regenerators, the two regenerators which have been known as the air regenerators being especially subject to these deposits, and to such an extent as to become very much clogged, and to necessitate periodical interruptions in the operation of the furnace and the removal of the deposits, or the replacement of the checkers, or the rebuilding of the regenerators. This removal of the deposits has been accomplished only by a slow, laborious, and expensive mechanical process, and could not be undertaken until the operation of the furnace had been entirely stopped and the furnace allowed to cool down for a considerable period. Also replacement of the checkers in the regenerators is expensive and requires a complete interruption in the operation of the furnace for a considerable period.

One of the objects of this invention is to provide an improved process and an improved apparatus for the manufacture of open hearth steel, the improved furnace comprising two pairs of checker chambers or regenerators, which, by the application of the improved process, will be kept substantially free from objectionable deposits, such as have been incident to the use of regenerators in connection with steel furnaces as hereinbefore noted, and in which the periodical interruption and costly repairs hereinbefore noted, necessitated by such deposits, will be, to a large extent, obviated.

Other objects of this invention will appear hereinafter.

This invention may be briefly indicated by stating that I have discovered that, if, in a furnace of the character above described, instead of supplying gaseous fuel to the furnace always alternately through the same two regenerators, known as the gas regenerators, and the air always alternately through the other two regenerators, known as the air regenerators, the operation be reversed occasionally, and the fuel be supplied alternately through the "air regenerators," and the air be supplied through the "gas regenerators," the objectionable deposits hereinbefore noted will not accumulate to any appreciable extent in any of the regenerators, and the loss of efficiency and periodical interruptions heretofore caused by such deposits will be much less frequent. This very desirable result has been obtained in the actual practice of this invention, but no attempt is here made to explain any theory or theories upon which this result might be based, as the chemical or other actions involved may not be fully understood at this time. The improved apparatus and the improved process, forming the subject matter of this invention, are, however, fully described hereinafter, so that the construction and operation of the apparatus and the practice of the process may be effected by those skilled in the art.

Figure 3:
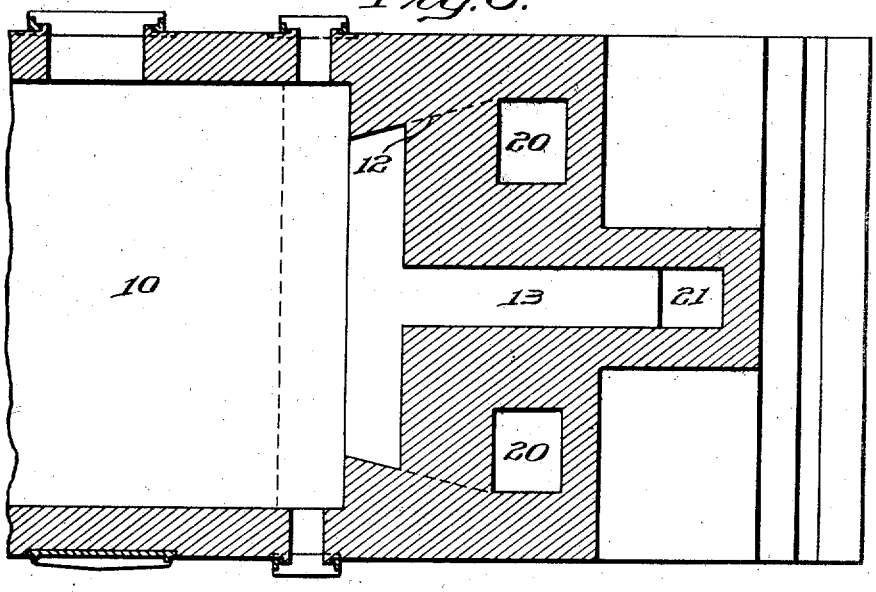
Figure 2:
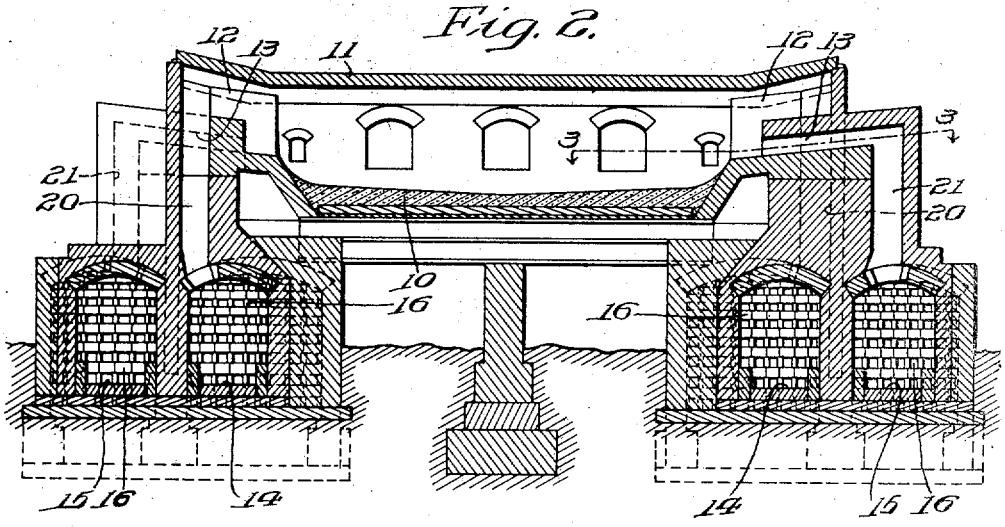

In the accompanying drawings, Figure 1 is a fragmentary horizontal section of a furnace constructed in accordance with this invention; Fig. 2 a fragmentary vertical section of the same on line 2—2 of Fig. 1, and Fig. 3 an enlarged fragmentary horizontal section of the same on line 3—3 of Fig. 2.

One embodiment of this invention comprises an open hearth steel furnace including the usual or any suitable hearth 10 arched over by the usual or any suitable roof 11. At each end of the furnace are two ports 12 and 13 opening into the space between the hearth 10 and its roof 11. These two ports are preferably arranged one above the other, and the upper port 12 is primarily intended to be used alternately for the inlet of air and for the outlet of exhaust gases, and the lower port 13 is primarily intended to be used alternately for the inlet of gaseous fuel and for the outlet of exhaust gases. The upper port 12 is generally called and will be referred to hereinafter as an "air port," and the lower port 13 is generally called and will be referred to hereinafter as a "gas port."

Adjacent each end of the furnace and preferably in a plane below the arch 10 are two regenerators or checker chambers 14 and 15, of the usual or any suitable construction, the interior of each regenerator being preferably sub-divided into a plurality of passages by bricks or "checkers" 16.

One regenerator 14, of each pair or set communicates with the corresponding air port 12 through an upwardly extending passage or flue 20 leading from the inner end of the regenerator to the port, and will be referred to hereinafter as an air regenerator, being intended primarily for regeneration or preheating of air.

The other regenerator 15, of each pair communicates with the corresponding gas port 13 through an upwardly extending passage or flue 21, leading from the inner end of the latter regenerator to the gas port. This latter regenerator will be referred to hereinafter as the gas regenerator, being intended primarily for the regeneration or preheating of gaseous fuel.

There is also provided a gas producer (not shown), or other source of supply of gaseous fuel for the furnace, and a stack 25 is provided for the passage of exhaust gases from, and to create a suitable draft through, the furnace.

For controlling the flow of gas, air and exhaust gases, through the furnace, two valves 30 and 31 are arranged between the two sets of regenerators. These valves may be of the usual reversing type or four-way construction, controlled by the rotation of a movable plug. One, 30, of these valves which may be referred to hereinafter as the gas reversing valve, is provided with and controls four openings, 35, 36, 37, and 38, connected respectively to the stack 25, the source of gas supply, and the outer end of each of the two "gas regenerators" 15 by suitable conduits 39, 40, 41 and 42. The other, 31, of these valves, which may be referred to hereinafter as the air reversing valve, is also provided with four openings 45, 46, 47 and 48, connected respectively to the stack 25, the source of air supply, and the outer end of each "air regenerator" 14 by suitable conduits 39, 49, 50 and 51.

The construction and the arrangement of the reversing valve 30 and its connections are such that, by the proper adjustment of the valve 30, gaseous fuel or gas from the source of gas supply may be directed by the valve inwardly through one gas regenerator 15, and at the same time, the exhaust gases may be directed by the same valve outwardly from the furnace through the other gas regenerator 15 and through the valve 30 to the stack 25; or the valve 30 may be adjusted to reverse the flow, or in other words, to direct the "gas" inwardly through the latter gas regenerator and the exhaust gases outwardly through the other gas regenerator; or the valve 30 may be adjusted to connect both gas regenerators simultaneously to the stack. In the same manner, by proper adjustment of the reversing air valve 31, the air may be directed through the air valve 31 and inwardly through one of the air regenerators 14, and at the same time, exhaust gases may be directed outwardly through the other air regenerator 14 and through the air valve 31 and to the stack 25; or the air valve 31 may be adjusted to reverse the flow of air and exhaust gases through the air regenerators 14; or the air valve 31 may be adjusted to connect both air regenerators to the stack.

The conduit 40 between the reversing gas valve 30 and the source of gas supply is controlled by a three-way valve 54, having three openings connecting with the reversing gas valve, the source of gas, and the source of air supply respectively. This three-way valve 54 may be adjusted to cut off the supply of gas from the reversing gas valve 30 and to substitute a supply of air, or the reverse, or to close the conduit 40.

For supplying gaseous fuel to the furnace through the air regenerators 14, the conduit 50 leading into the outer end of one of the air regenerators is provided with a branch gas conduit 55, the outer end of which communicates with the source of gas supply, and the conduit 51, leading into the outer end of the other air regenerator, is provided with a branch gas conduit 56, also communicating with the source of gas supply. These branch conduits 55 and 56 are controlled by valves 57 and 58 respectively. The air conduit 49, leading from the surrounding atmosphere to the reversing air valve 31, is also controlled by a valve 59, so that the supply of air may be cut off from the air reversing valve 31, when it is desired to utilize either of these regenerators for the passage of gas from either of the branch conduits 55 and 56. This valve 59 may be in the form of a three-way valve and be connected to the source of air supply or gaseous fuel by a branch conduit 60 so that the valve may be used to cut off the supply of air from the air reversing valve 31 and substitute a supply of gaseous fuel, or the reverse, or to close the conduit 49 and cut off both the supply of air and the supply of gases from the air reversing valve 31. When a three-way reversing valve is thus used, the branch gas conduits 55 and 56 may be omitted.

In the operation of this improved furnace, the furnace is first heated in the usual manner by a wood or coal fire until the regenerators or checker chambers 14 and 15 have attained a dull red heat. During this period the air and gas reversing valves 30 and 31 and the other controlling valves of the furnace are preferably adjusted, so as to connect both sets of regenerators to the stack 25. After the regenerators have been thus heated, the gas and air reversing valves 30 and 31 and the other controlling valves of the furnace are preferably adjusted, so as to direct the air and the gaseous fuel or "gas" inwardly through the air regenerator 14 and the gas regenerator 15, respectively, of one set of the regenerators, and simultaneously to direct the gaseous products of combustion of the furnace outwardly through the two regenerators of the other set. The air and gas passing inwardly are preheated by the hot regenerators and pass from the regenerators through the corresponding ports 12 and 13 and into the space above the hearth 10, where the gas and air unite in combustion, the gases of combustion then passing out through the other pair of ports 12 and 13 and then through the other pair of regenerators 14 and 15, and finally out through the stack 25. At frequent intervals, the currents of air and "gas" are preferably reversed and are caused to flow inwardly through the pair of regenerators which have been reheated during the preceding period by the exhaust gases, and the exhaust gases are discharged through the other pair of regenerators. These reversals are preferably made with gradually increasing frequency until the temperature of the furnace has been raised to a full melting heat. The furnace is then "charged" with the usual steel making materials, and the reversals of gas and air and gaseous products of combustion are continued as just described, the reversals now being generally made every fifteen or twenty minutes. Ordinarily, in thus reversing the currents of gas and air, the gas is changed from one gas regenerator 15 to the other gas regenerator 15 and the air is changed accordingly, but, to avoid the accumulation of objectionable deposits, as hereinbefore described, occasionally, in reversing the currents of air and gas, the gas is changed from the gas regenerator 15 to the air regenerator 14 of the other set, and the air is changed from the air regenerator 14 of one set to the gas regenerator 15 of the other set. The air and gas or gaseous fuel are then run, for several reversals, through the gas and air regenerators respectively.

It has been found that by running the "gas" through the air regenerator of one set of regenerators, and the air through a "gas" regenerator of the same set, for two or three reversals, every other heat, and doing the same with the other set of regenerators on the alternate heats, and during the remainder of the time alternating the gas through the gas regenerators and the air through the air regenerators, the regenerators will be kept substantially clear of the objectionable deposits noted. It has also been found that these reversals of the air and gas through the gas and air regenerators respectively, are particularly effective for the purpose described, if accomplished just after the bath has become molten and the lime is rising to the surface of the hearth.

Although only a single form of apparatus has been illustrated in which this invention may be embodied, the invention is not limited to the specific construction disclosed, as it is evident that various modifications might be made in the construction, and that the invention might be applied to various other forms of apparatus. Furthermore, as gas and air regenerators are used for various purposes, it is evident that the invention is not limited in its scope to an apparatus or to a process for the manufacture of steel, but might be applied to other apparatus for other purposes, without departing from the spirit of the invention or the scope of the appended claims.

Having thus fully described this invention, I claim and desire to protect by Letters Patent of the United States:

1. The combination with two regenerators, of means for supplying either of said regenerators selectively with gaseous fuel and the other regenerator with air.

2. The combination with two regenerators, of means for supplying either of said regenerators selectively with gaseous fuel, and the other regenerator with air, and means for reversing the process by supplying the first mentioned regenerator with air and the second mentioned regenerator with gaseous fuel.

3. In a furnace, the combination with a hearth, of a pair of regenerators communicating with said hearth, and means for supplying either of said regenerators selectively with air and the other regenerator with gaseous fuel.

4. In a furnace, the combination with a hearth, of two pairs of regenerators communicating therewith, means for supplying either regenerator of either pair selectively with air and the other with gaseous fuel, and means for directing exhaust gases from the hearth simultaneously outwardly through the other pair of regenerators.

5. The process which comprises the steps of passing air, exhaust gases of combustion, gaseous fuel, and exhaust gases of combustion consecutively and in the order named through a regenerator chamber.

6. In the manufacture of steel, the process which consists of passing gases of combustion from a furnace outwardly through a regenerator, then passing air inwardly through the regenerator, then passing gases of combustion outwardly from the furnace through the regenerator, and then passing gaseous fuel inwardly through the regenerator.

7. The process of keeping clean the interior regenerative surfaces of a heated regenerator chamber of an open hearth steel furnace, which comprises the steps of passing air and combustible gas in relative alternation through such regenerator chamber, each such alternation being maintained a sufficient time to remove any deposits from such surfaces.

8. The process of removing incombustible deposits from an air regenerator, which comprises the step of passing combustible gas through such regenerator in relative alternation with the passage of air therethrough.

9. A process for removing or preventing accumulations of incombustible deposits, such for instance as iron oxid, in regenerators of open hearth steel furnaces, which consists in passing fresh air from time to time through the gas regenerators and fresh gaseous fuel through the air regenerators.

In witness whereof I have hereunto set my hand this 20th day of May, 1914.

NORMAN E. MACCALLUM.

Witnesses:
P. W. King,
B. A. Dougherty.